US009632757B2

(12) United States Patent
Shi et al.

(10) Patent No.: US 9,632,757 B2
(45) Date of Patent: Apr. 25, 2017

(54) CUSTOM CLASS LIBRARY GENERATION METHOD AND APPARATUS

(71) Applicant: Intel Corporation, Santa Clara, CA (US)

(72) Inventors: Lei luc Shi, Beijing (CN); Xin Wang, Beijing (CN); Mingqiu Sun, Beaverton, OR (US); Ligang Wang, Beijing (CN); Gopinatth Selvaraje, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 14/778,521

(22) PCT Filed: Sep. 10, 2014

(86) PCT No.: PCT/CN2014/086215
§ 371 (c)(1),
(2) Date: Sep. 18, 2015

(87) PCT Pub. No.: WO2016/037327
PCT Pub. Date: Mar. 17, 2016

(65) Prior Publication Data
US 2016/0291946 A1    Oct. 6, 2016

(51) Int. Cl.
*G06F 9/44*          (2006.01)

(52) U.S. Cl.
CPC .................. *G06F 8/36* (2013.01); *G06F 8/31* (2013.01); *G06F 8/315* (2013.01)

(58) Field of Classification Search
CPC ............... G06F 8/31; G06F 8/315; G06F 8/36
(Continued)

(56) References Cited

U.S. PATENT DOCUMENTS 7,243,346 B1 *  7/2007  Seth ........................ G06F 9/445
                                                        717/162
7,389,515 B1 *  6/2008  Seth .................... G06F 9/44594
                                                        719/310
(Continued)

FOREIGN PATENT DOCUMENTS

CN    102004662 A    4/2011
CN    102880474 A    1/2013

OTHER PUBLICATIONS

International Search Report and Written Opinion mailed Jun. 8, 2015 for International Application No. PCT/CN2014/086215, 11 pages.

*Primary Examiner* — Qing Chen
(74) *Attorney, Agent, or Firm* — Schwabe, Williamson & Wyatt, P.C.

(57) ABSTRACT

Apparatuses, methods and storage media associated with generating a custom class library are disclosed herein. In embodiments, an apparatus may include an analyzer configured to receive a workload for a device and a class library used by the workload, analyze the workload and class library, identify one or more workload full API call chains, and generate information about the one or more workload full API call chains. Further, the apparatus may include a generator to generate from the class library, a custom class library for the workload that is smaller than the class library, based at least in part on the one or more workload full API call chains. Other embodiments may be disclosed or claimed.

25 Claims, 5 Drawing Sheets

(58) Field of Classification Search
USPC .......................................... 717/106–109, 118
See application file for complete search history.

(56) References Cited

U.S. PATENT DOCUMENTS

2007/0067325 A1    3/2007   Weitzner et al.
2012/0311526 A1   12/2012   DeAnna et al.

* cited by examiner

CUSTOM CLASS LIBRARY GENERATION METHOD AND APPARATUS

CROSS REFERENCE TO RELATED APPLICATIONS

The present application is a national phase entry under 35 U.S.C. §371 of International Application No. PCT/CN2014/086215, filed Sep. 10, 2014, entitled "CUSTOM CLASS LIBRARY GENERATION METHOD AND APPARATUS", which designated, among the various States, the United States of America. The Specification of the PCT/CN2014/086215 Application is hereby fully incorporated by reference.

TECHNICAL FIELD

The present disclosure relates to the field of computing, in particular, to apparatuses, methods and storage media associated with generating a custom class library for a device.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Internet of Things (IoT) is booming Huge volumes of IoT sensors, controllers and smart meters being deployed are typically designed with very limited resources in terms of memory and flash space for applications to run. For example, most edge devices have less than 1 MB of total memory.

In particular, there is a strong demand to run Java® applications on these devices for the cross-platform application portability and the massive Java® developer base. However, standard Java® Virtual Machine (JVM) class libraries are normally too big to fit into the tiny IoT devices. For example, a standard JVM runtime usually contains a large library, such as the OpenJDK library of Java 7, which contains 4024 application programming interfaces (APIs) and takes about 80 MB of storage.

A typical solution to address this problem is to create a small version of Java® by reducing the functionality of the Java® class library, such as Oracle's JavaCard and J2ME. However, such an approach sacrifices functionalities and destroys compatibility with desktop and server Java® applications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage media associated with generating a custom class library are disclosed herein. In embodiments, an apparatus may include an analyzer configured to receive a workload and a class library, analyze the workload and class library, identify one or more workload full API call chains, and generate information about the one or more workload full API call chains. The one or more workload full API call chains may include direct calls from the workload to the class library, and subsequent calls within the class library resulted from the direct calls from the workload to the class library. Further, the apparatus may include a generator to generate, from the class library, a custom class library for the workload that is smaller than the class library, based at least in part on the one or more workload full API call chains. An example of the class library may be a JVM class library. An example of the workload may be a workload for an IoT device.

In the following detailed description, reference is made to the accompanying drawings, which form a part hereof, wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of certain embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
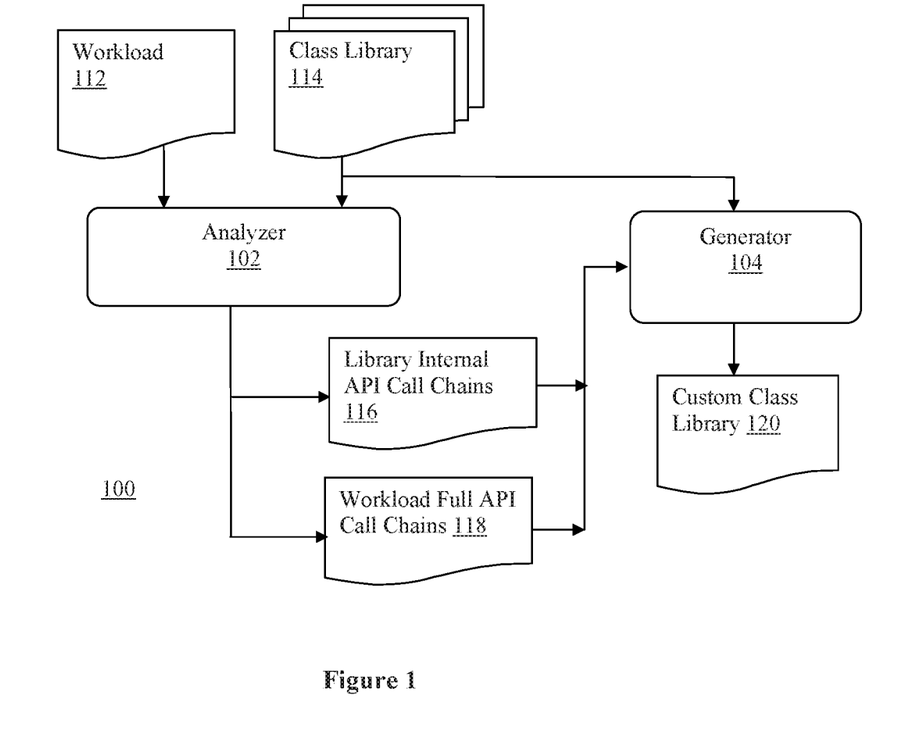
FIG. 1 illustrates a component view of the present disclosure for generating a custom class library for a device, in accordance with various embodiments.

Referring now to FIG. 1, a component view of the present disclosure for generating a custom class library for a device, in accordance with various embodiments, is illustrated. As illustrated, an arrangement 100 for generating a custom class library for a device, e.g., a custom Java® class library for an IoT device, may include analyzer 102 and generator 104. In embodiments, analyzer 102 may be configured to receive workload 112 for a device, and class library 114 used by workload 112, as inputs, and to analyze workload 112 and class library 114 to identify one or more library internal API call chains 116 and one or more workload full API call chains 118. Additionally, analyzer 102 may be configured to generate information about the one or more library internal API call chains 116 and the one or more workload full API call chains 118. The one or more workload full API call chains 118 may include direct calls from workload 112 to class library 114, and subsequent calls within class library 114 resulted from the direct calls from workload 112 to class library 114. Further, generator 104 may be configured to generate from class library 114, custom class library 120 for workload 112 that is smaller than the class library 114, based at least in part on the one or more workload full API call chains 118. The smaller size may be achieved through exclusion of the non-invoked classes and APIs of the full class library. Resultantly, relatively compact custom class libraries 120 may be generated for a wide variety of small IoT devices with limited resources and that run only relatively small workloads, while maintaining compatibility across platforms for workload 112. Examples of IoT devices may include, but are not limited to, wearable devices, industrial Internet devices, home automation devices, and so forth.

Figure 2:
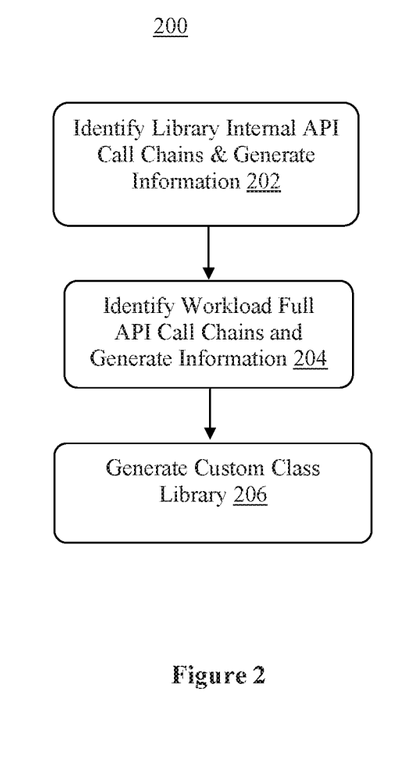
FIG. 2 illustrates an overview of a process for generating a custom class library for a device, in accordance with various embodiments.

Referring now to FIG. 2, an overview of a process for generating a custom class library for a device, in accordance with various embodiments, is shown. As illustrated, process 200 for generating custom class library 120 for a device may include operations performed at blocks 202-206. The operations of blocks 202 and 204 may be performed, e.g., by the earlier described analyzer 102 of FIG. 1. The operations of block 206 may be performed, e.g., by the earlier described generator 104 of FIG. 1.

Process 200 may start at block 202. At block 202, a class library may be scanned and analyzed to identify library internal API call chains and generate information about these library internal API call chains. The operations will be further described later on with reference to FIG. 3. From block 202, process 200 may proceed to block 204.

At block 204, a workload may be scanned and analyzed to identify workload full API call chains and generate information about these workload full API call chains. Recall that the one or more workload full API call chains may include direct calls from the workload to the class library, and subsequent calls within the class library resulted from the direct calls from the workload to the class library. In embodiments, the workload may be similarly scanned and analyzed on a Breadth First Search (BFS) basis. The operations will be further described later on with reference to FIG. 4. From block 204, process 200 may proceed to block 206.

At block 206, a custom class library that is smaller than the class library may be generated from the class library, based at least in part on the workload full API call chains. The operations will be further described later on with reference to FIG. 5. From block 206, process 200 may end.

Figure 3:
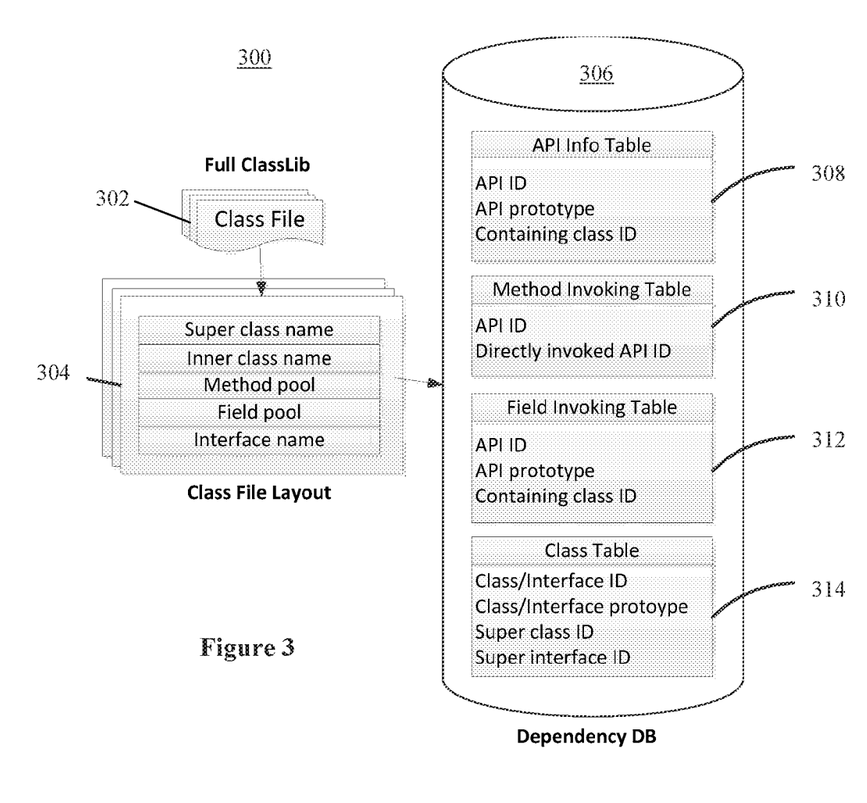
FIG. 3 illustrates generation of library internal API call chains, in accordance with various embodiments.

Referring now to FIG. 3, generation of library internal API call chains, in accordance with various embodiments, is shown. As illustrated, in embodiments, class files 302 in a class library (e.g., class library 114) may each include a class file layout 304 having super class name, inner class name, method pool, field pool, interface name, and so forth. Class files 302 may be scanned and analyzed for dependency to generate a topological connectivity graph to represent the calling relationship between each class and/or API in the class library. In embodiments, class files 302 may be scanned and analyzed on a Breadth First Search (BFS) basis. All class library internal API invoking and invoked relationship information obtained from the scanning and analysis may be stored in a dependency database (DB) 306. In embodiments, the information may be stored in at least four tables, API Info Table 308, Method Invoking Table 310, Field Invoking Table 312 and Class Table 314. In alternate embodiments, more or fewer tables, or other data structures, may be used instead.

API info table 308 may store an API ID, the API's prototype and the API's containing class ID. In embodiments, the API ID may be a unique identifier assigned to each API (in the case of Java®, including each Java® field and each Java® method) as part of the scanning analysis. The API prototype (return value and parameters) may be obtained from class files 302. Containing class ID may be obtained from Class Table 314 (after it has been built) by searching the class name.

Method Invoking Table 310 may store information of method(s) directly invoked by a given API. In the case of Java®, one part of the invoked method(s) may be obtained from the bytecode of invoke_virtual and invoke_static. The operand of bytecode indicates invoked API name and containing class. The other part of the invoked method(s) may be obtained from the bytecode of invoke_special and invoke_interface. The operand of the bytecode indicates invoked API and the accurate super class or interface may be determined by searching Class Table 304 (after it has been built).

Field Invoking Table 312 may store information of field(s) directly invoked by a given API. In the case of Java®, the invoked field name(s) may be obtained from the bytecode of putfield, getfield, putstatic and getstatic. The operand of the bytecode is invoked field names, and they may be converted into API ID by searching API Info Table 308.

Class Table 314 may store information of each class/interface and their inheritance relationship obtained during scanning.

Figure 4:
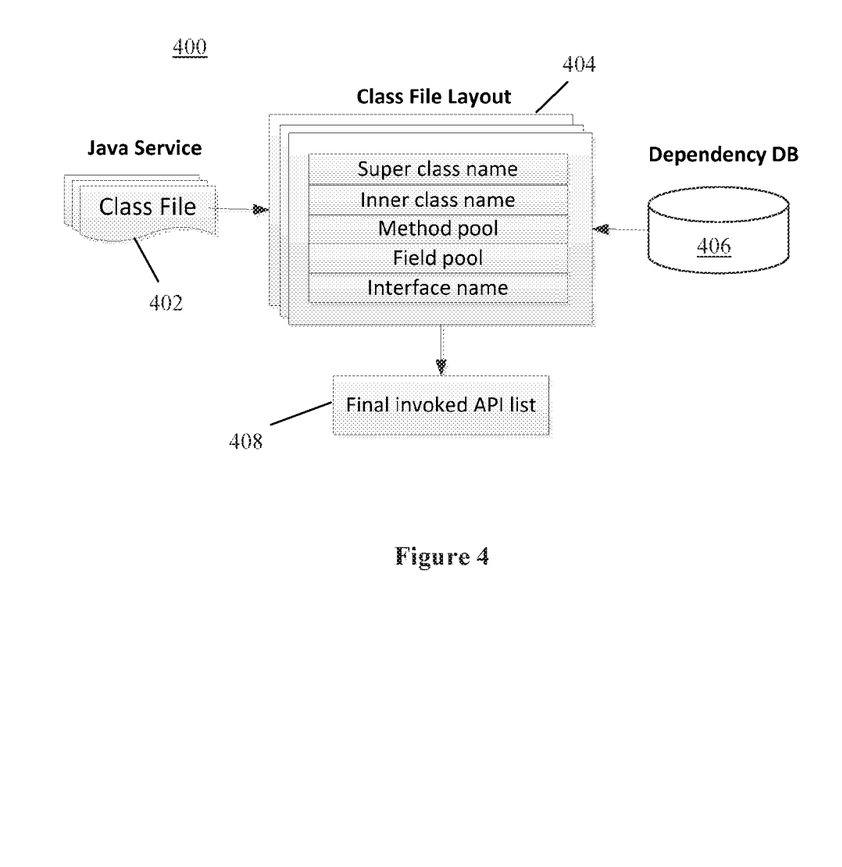
FIG. 4 illustrates generation of workload full API call chains, in accordance with various embodiments.

Referring now to FIG. 4, generation of workload full API call chains, in accordance with various embodiments, is shown. As illustrated, in embodiments, a class file 402 in a workload (e.g., workload 112) may include a class file layout 404 having information similar to class file layout 304 earlier described. Class files 402 may be scanned and analyzed to identify all the direct calls from the workload to a class library. The subsequent calls within the class library resulted from the direct calls from the workload to the class library may be obtained from dependency DB 406 having class library internal call chain information (similar to earlier described dependency DB 306). Similar to the scanning and analysis of class files 302, class files 402, together with the subsequent calls within the class library may be likewise scanned and analyzed on a Breadth First Search (BFS) basis. As a result, final invoked API list 408 having the workload full API call chains that include the resulting subsequent calls within the library may be generated.

Figure 5:
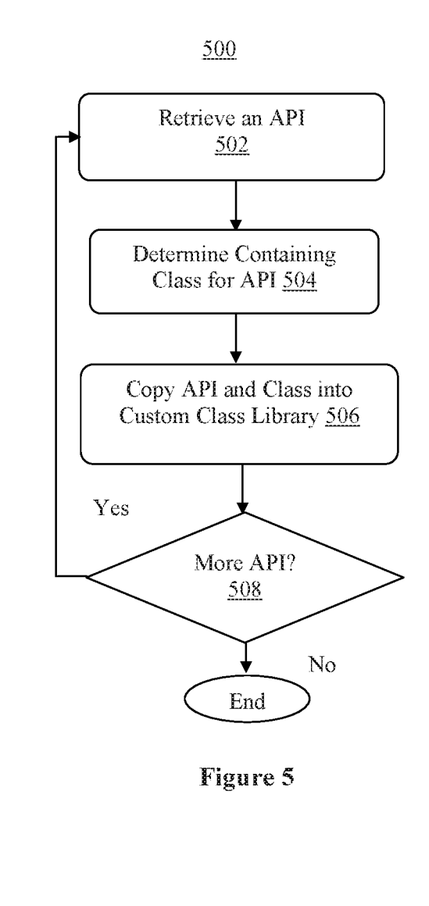
FIG. 5 illustrates generation of the custom class library in further details, in accordance with various embodiments.

Referring now to FIG. 5, generation of the custom class library in further details, in accordance with various embodiments, is shown. As illustrated, operations 500 for generating the custom class library may include operations performed in blocks 502-508. The operations may be performed, e.g., by the earlier described generator 104 of FIG. 1.

At block 502, an API may be retrieved, e.g., from the earlier described API Table 308 in dependency DB 306.

At block 504, a determination may be made about the containing class for the API, e.g., from the earlier described API Table 308 in dependency DB 306.

At block 506, the retrieved API and its containing class may be copied into the custom class library.

At block 508, a determination may be made on whether all applicable APIs have been examined, that is all APIs involved as indicated by the workload full API call chains. The determination may be made, e.g., based on whether all APIs have been retrieved from API Table 308 in dependency DB 306, and examined. If all applicable APIs have been examined, the generation operations may end. However, if not all applicable APIs have been examined, operations 500 may continue back at block 502, as earlier described.

Operations at blocks 502-508 may then be repeated. Operations at blocks 502-508 may then be repeated as many times as necessary, until all applicable APIs (e.g., all APIs within API Table 308 in dependency DB 306) have been examined/processed.

Figure 6:
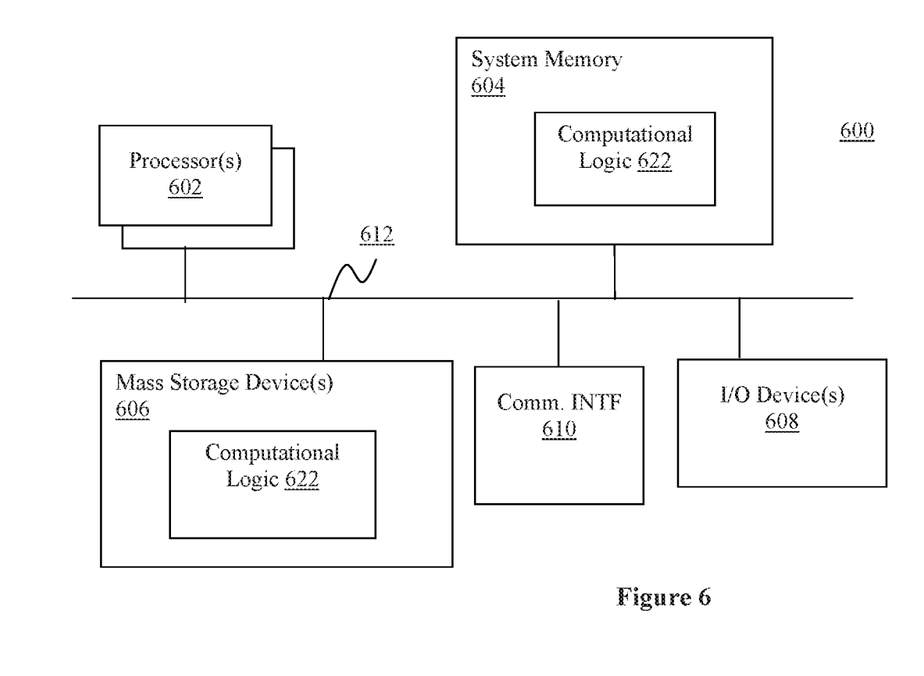
FIG. 6 illustrates a component view of an example computer system suitable for practicing the disclosure, in accordance with various embodiments.

Referring now to FIG. 6, wherein an example computer suitable for use for the arrangement of FIG. 1, in accordance with various embodiments, is illustrated. As shown, computer 600 may include one or more processors or processor cores 602, and system memory 604. In embodiments, multiples processor cores 602 may be disposed on one die. For the purpose of this application, including the claims, the terms "processor" and "processor cores" may be considered synonymous, unless the context clearly requires otherwise. Additionally, computer 600 may include mass storage device(s) 606 (such as diskette, hard drive, compact disc read only memory (CD-ROM) and so forth), input/output device(s) 608 (such as display, keyboard, cursor control and so forth) and communication interfaces 610 (such as network interface cards, modems and so forth). In embodiments, a display unit may be touch screen sensitive and includes a display screen, one or more processors, storage medium, and communication elements, further it may be removably docked or undocked from a base platform having the keyboard. The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage device(s) 606 may be employed to store a working copy and a permanent copy of the programming instructions implementing the operations described earlier, e.g., but not limited to, operations associated with analyzer 102 and/or generator 104, denoted as computational logic 622. The various elements may be implemented by assembler instructions supported by processor(s) 602 or high-level languages, such as, for example, C, that can be compiled into such instructions.

The permanent copy of the programming instructions may be placed into permanent mass storage device(s) 606 in the factory, or in the field, through, for example, a distribution medium (not shown), such as a compact disc (CD), or through communication interface 610 (from a distribution server (not shown)). That is, one or more distribution media having an implementation of an agent program may be employed to distribute the agent and program various computing devices.

The number, capability and/or capacity of these elements 610-612 may vary, depending on the intended use of example computer 600, e.g., whether example computer 600 is a smartphone, tablet, ultrabook, laptop or a server. The constitutions of these elements 610-612 are otherwise known, and accordingly will not be further described.

Figure 7:
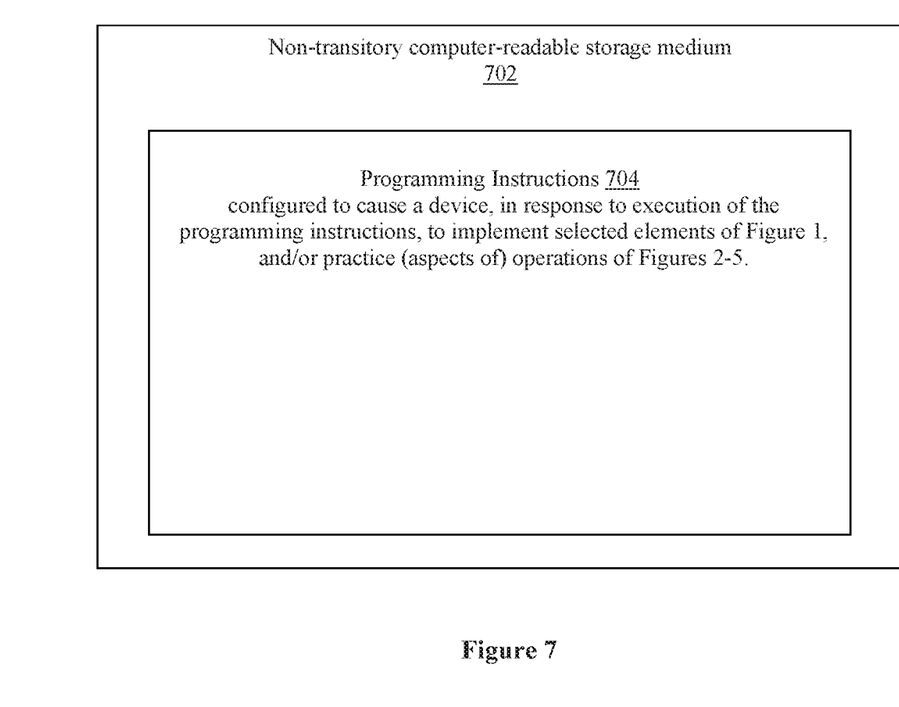
FIG. 7 illustrates an example storage medium with instructions configured to enable a computing device to practice the present disclosure, in accordance with various embodiments.

FIG. 7 illustrates an example non-transitory computer-readable storage medium having instructions configured to practice all or selected ones of the operations associated with analyzer 102 and/or generator 104, earlier described, in accordance with various embodiments. As illustrated, non-transitory computer-readable storage medium 702 may include a number of programming instructions 704. Programming instructions 704 may be configured to enable a device, e.g., computer 600, in response to execution of the programming instructions, to perform, e.g., various operations associated with analyzer 102 and/or generator 104 of FIG. 1 or various operations of FIGS. 2-5 respectively. In alternate embodiments, programming instructions 704 may be disposed on multiple non-transitory computer-readable storage media 702 instead. In still other embodiments, programming instructions 704 may be encoded in transitory computer readable signals.

Referring back to FIG. 6, for one embodiment, at least one of processors 602 may be packaged together with a computer-readable storage medium having computational logic 622 (in lieu of storing in system memory 604 and/or mass storage device 606) configured to practice all or selected ones of the operations associated with analyzer 102 and/or generator 104 of FIG. 1, or aspects of operations of FIGS. 2-5. For one embodiment, at least one of processors 602 may be packaged together with a computer-readable storage medium having computational logic 622 to form a System in Package (SiP). For one embodiment, at least one of processors 602 may be integrated on the same die with a computer-readable storage medium having computational logic 622. For one embodiment, at least one of processors 602 may be packaged together with a computer-readable storage medium having computational logic 622 to form a System on Chip (SoC). For at least one embodiment, the SoC may be utilized in, e.g., but not limited to, a hybrid computing tablet/laptop.

Accordingly, embodiments for generating custom class libraries for a device have been described. Example embodiments may include the following.

Example 1 may be an apparatus for generating a custom class library for a device. The apparatus may include one or more processors and an analyzer. The analyzer may be operated by the one or more processors to receive a workload for the device and a class library used by the workload, analyze the workload and the class library, identify one or more workload full application programming interface, API, call chains that include direct calls from the workload to the class library, and subsequent calls within the class library resulted from the direct calls from the workload to the class library, and generate information about the one or more workload full API call chains.

Example 2 may be example 1, wherein the analyzer may parse the class library, and based on a result of the parsing, generate connectivity information that describes a calling relationship between each class or API in the class library.

Example 3 may be example 2, wherein the analyzer may further generate, based on the result of the parsing, an API information table that stores for each API, a unique identifier of the API, a prototype of the API having a return value and one or more parameters, and the API's containing class identifier.

Example 4 may be example 2, wherein the analyzer may further generate, based on the result of the parsing, a method invoking table that stores for each API, one or more method identifiers identifying one or more methods directly invoked by the API.

Example 5 may be example 2, wherein the analyzer may further generate, based on the result of the parsing, a field invoking table that stores for each API, one or more field identifiers identifying one or more fields invoked by the API.

Example 6 may be any one of examples 1-5, wherein the analyzer may parse the workload, and based on a result of the parsing of the workload, generate one or more records of API invocation of the workload or the class library.

Example 7 may be example 6, wherein the analyzer may identify the one or more workload full API call chains, based at least in part on the one or more records of API invocation of the workload or the class library, and the connectivity information that describes a calling relationship between each class or API in the class library.

Example 8 may be any one of examples 1-7, further comprising a generator to be operated by the one or more processors to generate, from the class library, a custom class library for the workload that is smaller than the class library, based at least in part on the one or more workload full API call chains.

Example 9 may be example 8, wherein the class library may comprise a Java® Virtual Machine, JVM, class library.

Example 10 may be example 8, wherein the workload may comprise a workload for an Internet of Things (IoT) device.

Example 11 may be a method for generating a custom class library for a device. The method may comprise receiving, by a computing device, a workload for the device and a class library used by the workload; analyzing, by the computing device, the workload and the class library to identify one or more workload full application programming interface, API, call chains that include direct calls from the workload to the class library, and subsequent calls within the class library resulted from the direct calls from the workload to the class library; and generating, by the computing device, information about the one or more workload full API call chains.

Example 12 may be example 11, wherein analyzing may comprise parsing the class library, and based on a result of the parsing, generating connectivity information that describes a calling relationship between each class or API in the class library.

Example 13 may be example 12, wherein analyzing may further comprise generating, based on the result of the parsing, an API information table that stores for each API, a unique identifier of the API, a prototype of the API having a return value and one or more parameters, and the API's containing class identifier.

Example 14 may be example 12, wherein analyzing may further comprise generating, based on the result of the parsing, a method invoking table that stores for each API, one or more method identifiers identifying one or more methods directly invoked by the API.

Example 15 may be example 12, wherein analyzing may further comprise generating, based on the result of the parsing, a field invoking table that stores for each API, one or more field identifiers identifying one or more fields invoked by the API.

Example 16 may be any one of examples 11-15, wherein analyzing may comprise parsing the workload, and based on a result of the parsing of the workload, generating one or more records of API invocation of the workload or the class library.

Example 17 may be example 16, wherein analyzing may comprise identifying the one or more workload full API call chains, based at least in part on the one or more records of API invocation of the workload or the class library, and the connectivity information that describes a calling relationship between each class or API in the class library.

Example 18 may be any one of examples 11-17, further comprising generating from the class library, by the computing device, a custom class library for the workload that is smaller than the class library, based at least in part on the one or more workload full API call chains.

Example 19 may be example 18, wherein the class library may comprise a Java® Virtual Machine, JVM, class library.

Example 20 may be example 18, wherein the workload may comprise a workload for an Internet of Things (IoT) device.

Example 21 may be an apparatus for generating a custom class library for a device. The apparatus may comprise means for receiving a workload for the device and a class library used by the workload; means for analyzing the workload and the class library to identify one or more workload full application programming interface, API, call chains that include direct calls from the workload to the class library, and subsequent calls within the class library resulted from the direct calls from the workload to the class library; and means for generating information about the one or more workload full API call chains.

Example 22 may be example 21, wherein means for analyzing may comprise means for parsing the class library, and based on a result of the parsing, generating connectivity information that describes a calling relationship between each class or API in the class library.

Example 23 may be example 22, wherein means for analyzing may further comprise means for generating, based on the result of the parsing, an API information table that stores for each API, a unique identifier of the API, a prototype of the API having a return value and one or more parameters, and the API's containing class identifier.

Example 24 may be example 22, wherein means for analyzing may further comprise means for generating, based on the result of the parsing, a method invoking table that stores for each API, one or more method identifiers identifying one or more methods directly invoked by the API.

Example 25 may be example 22, wherein means for analyzing may further comprise means for generating, based on the result of the parsing, a field invoking table that stores for each API, one or more field identifiers identifying one or more fields invoked by the API.

Example 26 may be any one of examples 21-25, wherein means for analyzing may comprise means for parsing the workload, and based on a result of the parsing of the workload, generating one or more records of API invocation of the workload or the class library.

Example 27 may be example 26, wherein means for analyzing may comprise means for identifying the one or more workload full API call chains, based at least in part on the one or more records of API invocation of the workload or the class library, and the connectivity information that describes a calling relationship between each class or API in the class library.

Example 28 may be any one of examples 21-27, further comprising means for generating from the class library a custom class library for the workload that is smaller than the class library, based at least in part on the one or more workload full API call chains.

Example 29 may be example 28, wherein the class library may comprise a Java® Virtual Machine, JVM, class library.

Example 30 may be example 28, wherein the workload may comprise a workload for an Internet of Things (IoT) device.

Example 31 may be one or more non-transitory computer-readable storage medium having instructions that, in response to execution of the instructions by an apparatus, cause the apparatus to: receive a workload for the device and a class library used by the workload; analyze the workload and the class library; identify one or more workload full application programming interface, API, call chains that include direct calls from the workload to the class library, and subsequent calls within the class library resulted from the direct calls from the workload to the class library; and generate information about the one or more workload full API call chains.

Example 32 may be example 31, wherein to analyze may comprise to parse the class library, and based on a result of the parsing, generate connectivity information that describes a calling relationship between each class or API in the class library.

Example 33 may be example claim 32, wherein to analyze may comprise further to generate, based on the result of the parsing, an API information table that stores for each API, a unique identifier of the API, a prototype of the API having a return value and one or more parameters, and the API's containing class identifier.

Example 34 may be example 32, wherein to analyze may comprise to further generate, based on the result of the parsing, a method invoking table that stores for each API, one or more method identifiers identifying one or more methods directly invoked by the API.

Example 35 may be example 34, wherein to analyze may comprise to further generate, based on the result of the parsing, a field invoking table that stores for each API, one or more field identifiers identifying one or more fields invoked by the API.

Example 36 may be any one of examples 31-35, wherein to analyze may comprise to parse the workload, and based on a result of the parsing of the workload, generate one or more records of API invocation of the workload or the class library.

Example 37 may be example 36, wherein to analyze may further comprise to identify the one or more workload full API call chains, based at least in part on the one or more records of API invocation of the workload or the class library, and the connectivity information that describes a calling relationship between each class or API in the class library.

Example 38 may be any one of examples 31-37, wherein the apparatus may be further caused to generate from the class library, a custom class library for the workload that is smaller than the class library, based at least in part on the one or more workload full API call chains.

Example 39 may be example 38, wherein the class library may comprise a Java® Virtual Machine, JVM, class library.

Example 40 may be example 38, wherein the workload may comprise a workload for an Internet of Things (IoT) device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that certain embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for generating a custom class library for a device, comprising:
   one or more processors; and
   an analyzer to be operated by the one or more processors to receive a workload for the device and a class library used by the workload, analyze the workload and the class library, identify one or more workload full application programming interface (API) call chains that include direct calls from the workload to the class library and subsequent calls within the class library resulted from the direct calls from the workload to the class library, and generate information about the one or more workload full API call chains;
   wherein a generator is to generate, from the class library, a custom class library for the workload that is smaller than the class library, based at least in part on the one or more workload full API call chains.

2. The apparatus of claim 1, wherein the analyzer is to parse the class library, and based on a result of the parsing of the class library, generate connectivity information that describes a calling relationship between each class or API in the class library.

3. The apparatus of claim 2, wherein the analyzer is to further generate, based on the result of the parsing of the class library, an API information table that stores, for each API, a unique identifier of the API, a prototype of the API having a return value and one or more parameters, and the API's containing class identifier.

4. The apparatus of claim 2, wherein the analyzer is to further generate, based on the result of the parsing of the class library, a method invoking table that stores, for each API, one or more method identifiers identifying one or more methods directly invoked by the API.

5. The apparatus of claim 2, wherein the analyzer is to further generate, based on the result of the parsing of the class library, a field invoking table that stores, for each API, one or more field identifiers identifying one or more fields invoked by the API.

6. The apparatus of claim 1, wherein the analyzer is to parse the workload, and based on a result of the parsing of the workload, generate one or more records of API invocation of the workload or the class library.

7. The apparatus of claim 6, wherein the analyzer is to identify the one or more workload full API call chains, based at least in part on the one or more records of API invocation of the workload or the class library, and connectivity information that describes a calling relationship between each class or API in the class library.

8. The apparatus of claim 1, further comprising the generator, wherein the generator is to be operated by the one or more processors.

9. The apparatus of claim 1, wherein the class library comprises a Java® Virtual Machine (JVM) class library.

10. The apparatus of claim 1, wherein the workload comprises a workload for an Internet of Things (IoT) device.

11. A method for generating a custom class library for a device, comprising:
receiving, by one or more processors, a workload for the device and a class library used by the workload;
analyzing, by the one or more processors, the workload and the class library to identify one or more workload full application programming interface (API) call chains that include direct calls from the workload to the class library and subsequent calls within the class library resulted from the direct calls from the workload to the class library; and
generating, by the one or more processors, information about the one or more workload full API call chains;
wherein the one or more workload full API call chains are to be used to generate, from the class library, a custom class library for the workload that is smaller than the class library.

12. The method of claim 11, wherein analyzing comprises parsing the class library, and based on a result of the parsing of the class library, generating connectivity information that describes a calling relationship between each class or API in the class library.

13. The method of claim 12, wherein analyzing comprises generating, based on the result of the parsing of the class library, an API information table that stores, for each API, a unique identifier of the API, a prototype of the API having a return value and one or more parameters, and the API's containing class identifier.

14. The method of claim 12, wherein analyzing comprises generating, based on the result of the parsing of the class library, a method invoking table that stores, for each API, one or more method identifiers identifying one or more methods directly invoked by the API.

15. The method of claim 12, wherein analyzing comprises generating, based on the result of the parsing of the class library, a field invoking table that stores, for each API, one or more field identifiers identifying one or more fields invoked by the API.

16. The method of claim 11, wherein analyzing comprises parsing the workload, and based on a result of the parsing of the workload, generating one or more records of API invocation of the workload or the class library.

17. The method of claim 16, wherein analyzing comprises identifying the one or more workload full API call chains, based at least in part on the one or more records of API invocation of the workload or the class library, and connectivity information that describes a calling relationship between each class or API in the class library.

18. The method of claim 11, further comprising:
generating from the class library, by the one or more processors, the custom class library for the workload that is smaller than the class library, based at least in part on the one or more workload full API call chains.

19. At least one non-transitory computer-readable storage medium storing a plurality of instructions to cause an apparatus, in response to execution of the plurality of instructions by the apparatus, to:
receive a workload for a device and a class library used by the workload;
analyze the workload and the class library to identify one or more workload full application programming interface (API) call chains that include direct calls from the workload to the class library and subsequent calls within the class library resulted from the direct calls from the workload to the class library; and
generate information about the one or more workload full API call chains;
wherein the one or more workload full API call chains are to be used to generate, from the class library, a custom class library for the workload that is smaller than the class library.

20. The at least one non-transitory computer-readable storage medium of claim 19, wherein to analyze is to parse the class library, and based on a result of the parsing of the class library, generate connectivity information that describes a calling relationship between each class or API in the class library.

21. The at least one non-transitory computer-readable storage medium of claim 20, wherein to analyze is to further generate, based on the result of the parsing of the class library, an API information table that stores, for each API, a unique identifier of the API, a prototype of the API having a return value and one or more parameters, and the API's containing class identifier.

22. The at least one non-transitory computer-readable storage medium of claim 20, wherein to analyze is to further generate, based on the result of the parsing of the class library, a method invoking table that stores, for each API, one or more method identifiers identifying one or more methods directly invoked by the API.

23. The at least one non-transitory computer-readable storage medium of claim 20, wherein to analyze is to further generate, based on the result of the parsing of the class library, a field invoking table that stores, for each API, one or more field identifiers identifying one or more fields invoked by the API.

24. The at least one non-transitory computer-readable storage medium of claim 19, wherein to analyze is to parse the workload, and based on a result of the parsing of the workload, generate one or more records of API invocation of the workload or the class library.

25. The at least one non-transitory computer-readable storage medium of claim 19, wherein the apparatus is further caused to generate from the class library a custom class library for the workload that is smaller than the class library, based at least in part on the one or more workload full API call chains.

* * * * *